United States Patent
Bothwell et al.

(10) Patent No.: US 10,261,517 B2
(45) Date of Patent: Apr. 16, 2019

(54) DEFAULT IN-DETENT VERTICAL SPEED/ALTITUDE HOLD

(71) Applicant: Bell Helicopter Textron Inc., Fort Worth, TX (US)

(72) Inventors: Christopher Mike Bothwell, Grapevine, TX (US); Sung Kyun Kim, Bedford, TX (US); Jillian Samantha Alfred, Fort Worth, TX (US); Robert Earl Worsham, II, Weatherford, TX (US); Luke Dafydd Gillett, Grapevine, TX (US); Morganne Cody Klein, Fort Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 101 days.

(21) Appl. No.: 15/484,994

(22) Filed: Apr. 11, 2017

(65) Prior Publication Data

US 2018/0292841 A1 Oct. 11, 2018

(51) Int. Cl.
| | |
|---|---|
| *G05D 1/06* | (2006.01) |
| *B64C 13/50* | (2006.01) |
| *B64C 27/06* | (2006.01) |
| *B64C 27/56* | (2006.01) |
| *B64C 27/16* | (2006.01) |
| *B64C 27/605* | (2006.01) |
| *G05D 1/08* | (2006.01) |

(52) U.S. Cl.
CPC ........... *G05D 1/0607* (2013.01); *B64C 13/50* (2013.01); *B64C 13/503* (2013.01); *B64C 27/06* (2013.01); *B64C 27/56* (2013.01); *B64C 27/605* (2013.01); *G05D 1/0858* (2013.01)

(58) Field of Classification Search
CPC .... G05D 1/0607; B64C 13/503; B64C 27/06; B64C 27/56; B64C 27/605
See application file for complete search history.

(56) References Cited

U.S. PATENT DOCUMENTS

| | | | |
|---|---|---|---|
| 2008/0234881 A1* | 9/2008 | Cherepinsky | G05D 1/0858 701/7 |
| 2009/0266940 A1* | 10/2009 | Miller | B64C 13/10 244/223 |
| 2012/0072056 A1* | 3/2012 | Hasan | B64C 13/00 701/3 |

(Continued)

*Primary Examiner* — Yazan A Soofi
(74) *Attorney, Agent, or Firm* — Slater Matsil, LLP

(57) ABSTRACT

A rotorcraft including a flight control computer (FCC) providing a vertical speed hold for the rotorcraft, a collective control, and a collective trim motor connected to the collective control. The collective trim motor moves the collective control according to a collective set command generated by the FCC according to a target vertical speed and when the FCC determines the collective control is in-detent. A collective position sensor is connected to the collective control. The collective position sensor generates, and sends to the FCC, a collective position signal indicating the position of the collective control. A flight control device controls a flight parameter of the rotorcraft in response to a flight control device control signal received from the FCC. The FCC generates the flight control device control signal according to the collective position signal, and sends the flight control device control signal to a flight control device.

20 Claims, 5 Drawing Sheets

(56) References Cited

U.S. PATENT DOCUMENTS

| | | | |
|---|---|---|---|
| 2013/0060406 A1* | 3/2013 | Christensen | G05D 1/0858 |
| | | | 701/4 |
| 2016/0378121 A1* | 12/2016 | Shue | G05D 1/105 |
| | | | 701/7 |
| 2017/0313408 A1* | 11/2017 | Sheffer | B64C 13/18 |
| 2018/0251207 A1* | 9/2018 | Kim | B64C 13/04 |

* cited by examiner

DEFAULT IN-DETENT VERTICAL SPEED/ALTITUDE HOLD

TECHNICAL FIELD

The present invention relates generally to a system and method for automated flight control in a rotorcraft, and, in particular embodiments, to a system and method for default vertical speed hold or altitude hold for a rotorcraft.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

An embodiment rotorcraft includes a flight control computer (FCC) operable to provide a vertical speed hold for the rotorcraft, a collective control, and a collective trim motor connected to the collective control and in signal communication with the FCC. The collective trim motor is operable to move the collective control according to a collective set command generated by the FCC for providing the vertical speed hold according to a target vertical speed and in response to the FCC determining that the collective control is in-detent. The rotorcraft further includes a collective position sensor connected to the collective control and in signal communication with the FCC, where the collective position sensor is operable to generate, and send to the FCC, a collective position signal indicating the position of the collective control. One or more flight control devices are connected to the FCC and are operable to control a flight parameter of the rotorcraft in response to a flight control device control signal received from the FCC. The FCC is operable to generate the flight control device control signal according to the collective position signal, and to send the flight control device control signal to the one or more flight control devices.

An embodiment flight control system computer (FCC) for a rotorcraft includes a processor and a non-transitory computer-readable storage medium storing a program to be executed by the processor, with the program including instructions for providing a vertical speed hold. The instructions for providing the vertical speed hold including instructions for determining a target vertical speed for the rotorcraft in response to a pilot control of the rotorcraft being in an in-detent state, controlling positioning of one or more pilot controls according to the target vertical speed and in response one of the one or more pilot controls of the rotorcraft being in the in-detent state, and controlling one or more flight control devices of the rotorcraft according to positioning of the one or more pilot controls.

An embodiment method includes monitoring, by a flight control computer (FCC) of a rotorcraft, a detent state of a pilot control, where an in-detent state indicates that a pilot has released control of the pilot control, determining a target vertical speed by the FCC in response to detecting an in-detent state, determining at least one flight control setting according to the target vertical speed, and performing, by the FCC, a vertical speed hold by controlling a flight control device of the rotorcraft according to the flight control setting.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
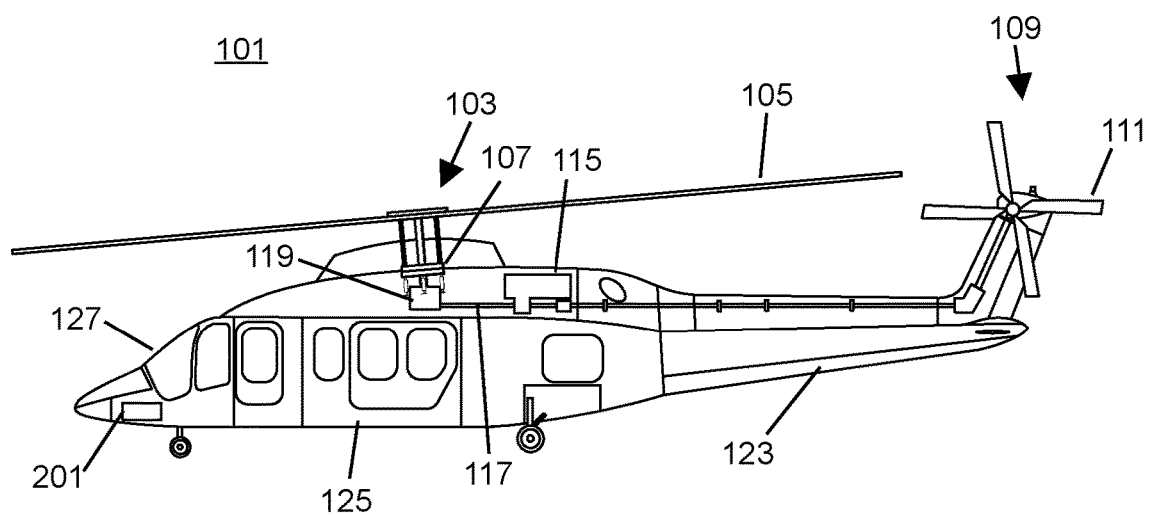
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW system controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW system controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the system presented herein are directed to providing a system and method for a vertical speed hold or default vertical speed. Flight control systems of a rotorcraft provide a subsystem that automatically determines whether a pilot is controlling the collective control, and automatically cause the rotorcraft to fly at or hold a selected or default vertical speed when the pilot is not controlling the collective control. The vertical speed hold permits a pilot to reach a desired vertical speed by manipulating the collective stick or pilot control, and then set the vertical speed hold to maintain the selected vertical speed without pilot intervention. The flight control system holds the vertical speed while it is "in detent," that is, while the flight control system detects that the pilot is not inputting any commands. Setting the default vertical speed reduces pilot workload and permits a pilot to concentrate "out the windshield" by reducing the need to monitor engine or vertical speed instrumentation. Additionally, the vertical speed hold system continuously monitors and adjusts the vertical speed to maintain the selected vertical speed by compensating for flight path disturbances such as wind or turbulence. The vertical speed hold system can be zeroed or set to a zero vertical speed so that the rotorcraft maintains level flight without pilot intervention. The pilot may cause the flight control system or one or more pilot controls to go out of detent (OOD) by grasping the relevant pilot controls or inputting a vertical speed command to override the default or selected vertical speed of the vertical speed hold. Once the pilot releases the collective stick and the flight control system goes in detent (ID), the flight control system applies the previously set vertical speed hold and causes the rotorcraft to move with the held vertical speed by automatically adjusting the collective to the required position. Thus, a pilot may select a vertical speed for the vertical speed hold, and may override the vertical speed hold at any time.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Figure 2:
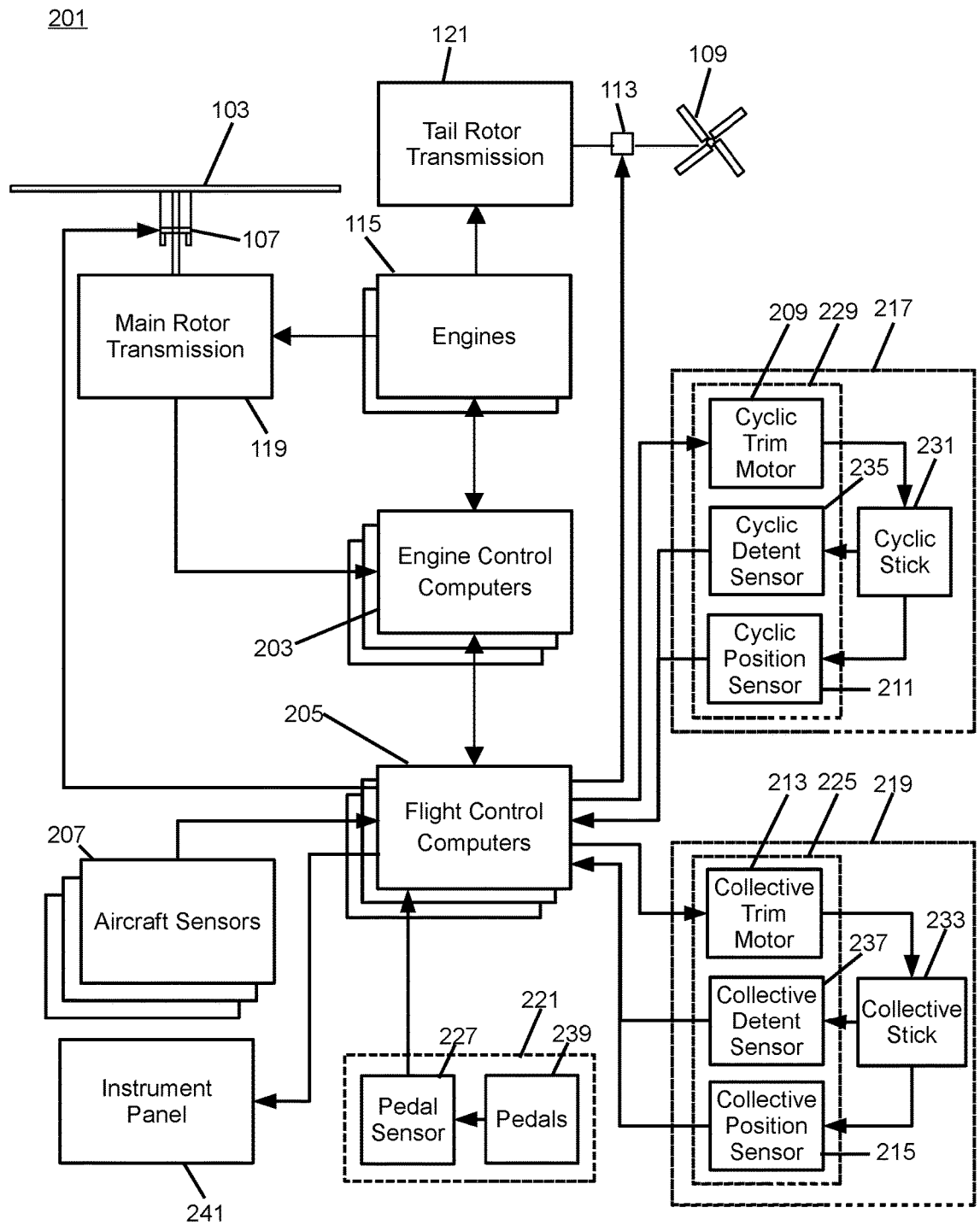
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic control stick 231. In some embodiments, the cyclic control stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic control stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective control stick 233 in the collective control assembly 219. In some embodiments, the collective control stick 233 is a single control stick that moves along a single axis or with a lever type action. A collective position sensor 215 detects the position of the collective control stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective control stick 233. Similar to the determination of the suggested cyclic stick position, in some embodiments, the FCCs 205 determine a suggested collective stick position for the collective control stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like, and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

The detent sensors 235 and 237 are connected to a drivetrain or transmission between the respective trim motors 209 and 213 and the respective stick 231 and 233. In some embodiments, the detent sensors 235 and 237 are separate from the position sensors 211 and 215. The detent sensors 235 and 237 may be referenced to the stick or axis they are measuring so that they move with the respective stick 231 and 233. Thus, when respective trim motors 209 and 213 move the respective stick 231 and 233, the detent sensor 235 and 237 are also moved. Accordingly, the detent sensors 235 and 237 do not need to account for movement of the stick 231 and 233 by the trim motors 213 and 209, and measure movement caused purely by the pilot. The detent sensors 235 and 237 determine the position of the respective stick 231 and 233 in relation to the output position of the respective trim motor 209 and 213, while the respective position sensor 211 and 215 measures the absolute position of the respective stick 231 and 233. In other embodiments, the detent sensors 235 and 237 may be a system that determines the different in the actual stick position and the suggested stick position, indicating that the pilot has moved the respective stick 231 and 233 from the suggested stick position. The detent sensors 235 and 237 may measure displacement, compression, or deflection of a mechanical element such as a spring, or may measure a difference in position of the stick 231 and 233 compared to an output shaft or output control of the respective trim motor 209 and 213. Thus, the detent sensors 235 and 237 may each generate a detent detection signal indicating a difference between the stick position and the position suggested or driven by the respective trim motor 209 and 213. The FCCs 205 may determine, if the difference between the stick position and the position suggested or driven by the trim motor 209 and 213 is greater than a threshold, that the pilot is inputting a command or otherwise in control of the stick 231 and 233. In yet other embodiments, the detent sensors 235 and 237 may be pressure sensors, contact sensors, capacitive sensors or another type of sensors disposed in one or more of the sticks 231 and 233 that detect that the pilot's hand is in contact with the respective stick 231 and 233.

When the FCCs 205 detect that a pilot has control of, or is manipulating, a particular control, the FCCs 205 may determine that stick 231 and 233 to be out-of-detent (OOD). The FCCs 205 determine that the stick 231 and 233 is in-detent (ID) when the FCCs 205 detect that the pilot has released a particular stick 231 and 233. The FCCs 205 may provide different default control or automated commands to one or more flight systems based on the detent status of a particular stick 231 and 233 or pilot control.

In an embodiment, the FCCs 205 provide a vertical speed hold capability when the collective stick 233 is ID. The vertical speed hold is a condition where the FCCs 205 cause the rotorcraft to default to a selected vertical speed, such as 1000 feet per minute (fpm) ascent, 300 fpm descent, or even a zero vertical speed. In some embodiments, a pilot may set a vertical speed, and release the collective stick 233. The FCCs 205 determine that the collective stick 233 has gone ID and will control the engines 115 and main rotor 103 to maintain the selected vertical speed. When the FCCs 205 determine that the collective stick 233 goes OOD as a result of the pilot reasserting control of the collective stick 233, the FCCs 205 react to the commands input on the collective stick 233 by the pilot, allowing the pilot to override the default or selected vertical speed. When the pilot again releases the collective stick 233, the FCCS 205 determine that the collective stick 233 has again gone ID, and will return the rotorcraft to the previous vertical speed selected by the pilot or hold the current vertical speed. In some embodiments, the selected vertical speed is a default vertical speed that can be reset by the pilot. For example, on startup, the default vertical speed may be set to zero fpm, or level flight. Thus, when a pilot takes off, the vertical speed held by the FCCs 205 is the default speed of zero fpm until a new vertical speed is selected.

In some embodiments, the vertical speed for the vertical speed hold may be selected by a pilot through, for example, a toggle switch, button, or the like, on the collective stick 233, on an instrument console, through a display, or on another control. In a particular and non-limiting embodiment, the pilot may press a force trim release (FTR) button disposed on a face of the collective stick 233 to set the selected vertical speed for the vertical speed hold to the current vertical speed of the rotorcraft. Thus, a pilot may fly the rotorcraft at a particular vertical speed, select that vertical speed for the vertical speed hold using the FTR button, and then release the collective stick 233 so that the FCCs 205 detect that the collective stick 233 is ID and maintain the vertical speed until the pilot retakes control of the collective stick 233. In other embodiments, the pilot may indicate a selected vertical hold speed by entering the desired vertical speed into a flight director system, autopilot system, dedicated vertical speed hold system, or the like. Additionally, in some embodiments, the FCCs 205 may indicate on the instrument panel 241 that a non-default vertical speed for the vertical speed hold has been selected, or indicate the selected vertical speed.

In some embodiments, the FCCs 205 may have thresholds or limits on altitude or other flight parameters that override application of the default or held vertical speed. For example, the FCCs 205 may enforce a minimum and/or maximum altitude or above ground level (AGL) height for applying the held vertical speed, so that the rotorcraft does not fly above a service ceiling, or too close to terrain. In some embodiments, the FCCs 205 may allow setting the vertical speed hold while the collective parameters or other rotorcraft operating parameters are in a normal operating range. In such an embodiment, the FCCs 205 may maintain a previously selected vertical speed as the actively selected vertical speed until an allowable vertical speed is selected. For example, while the rotorcraft collective is operating within a normal range, such as within a continuous power range, the FTR button on the collective stick 233 may operate to select a vertical speed for vertical speed hold. However, if the pilot drives the collective stick 233 past a normal operating range into an overdrive range or non-continuous operating range, such as a maximum takeoff power range, a collective overdrive range, or the like, the FCCs 205 may assign the FTR to another function such as a maximum power hold function. Thus, in some embodiments, the FCCs 205 will not accept, for the vertical speed hold, a selected vertical speed that exceeds the predetermined range, and the FTR button may be used for multiple functions depending on the flight parameters of the rotorcraft. In another example, if the pilot is overdriving an engine RPM, main rotor RPM or vertical speed by operating the rotorcraft beyond a predetermined maximum parameter range, the FCCs 205 may prevent the vertical hold speed from being set outside of the maximum allowable range for any flight parameter. In other embodiments, setting the held vertical speed may be limited to the normal operating range of the rotorcraft. For example, when a pilot overdrives the engine RPM, rotor RPM or collective setting, the pilot setting the vertical speed during the overdriven condition may result in the FCCs 205 using a maximum continuous power setting, or a maximum continuous vertical climb speed instead of the overdriven power or collective setting. In such a situation, the FCCs 205 may set the held vertical speed to a predetermined maximum, and treat the stick as being OOD so that when the pilot releases the collective stick 233, the FCCs 205 reduce the vertical speed or rotorcraft operating parameters to the predetermined maximum.

The FCCs 205 may cause the rotorcraft to achieve the held vertical speed or selected vertical speed by moving the collective stick 233 to a position corresponding to the collective setting needed to achieve the held vertical speed. Thus, when a pilot reengages with, or takes control of, the collective stick 233, the collective stick 233 is positioned so that the pilot is intuitively aware of the collective setting, and the collective stick 233 is in a position expected by the pilot in light of the actual operating conditions. For example, when the FCCs 205 cause the rotorcraft to hold a zero fpm vertical speed for level flight, the collective stick 233 will be positioned at the position normally associated with level flight. Thus, an altitude hold may effectively be performed using the vertical speed hold with a zero fpm vertical speed, and when the pilot grasps the collective stick 233, the stick is positioned where the pilot expects. Similarly, when the FCCs 205 employ a held vertical speed resulting in vertical climb or descent, the FCCs 205 will position the collective stick 233 in a position associated with the actual vertical speed, and which is different from that associated with level flight.

Figure 3:
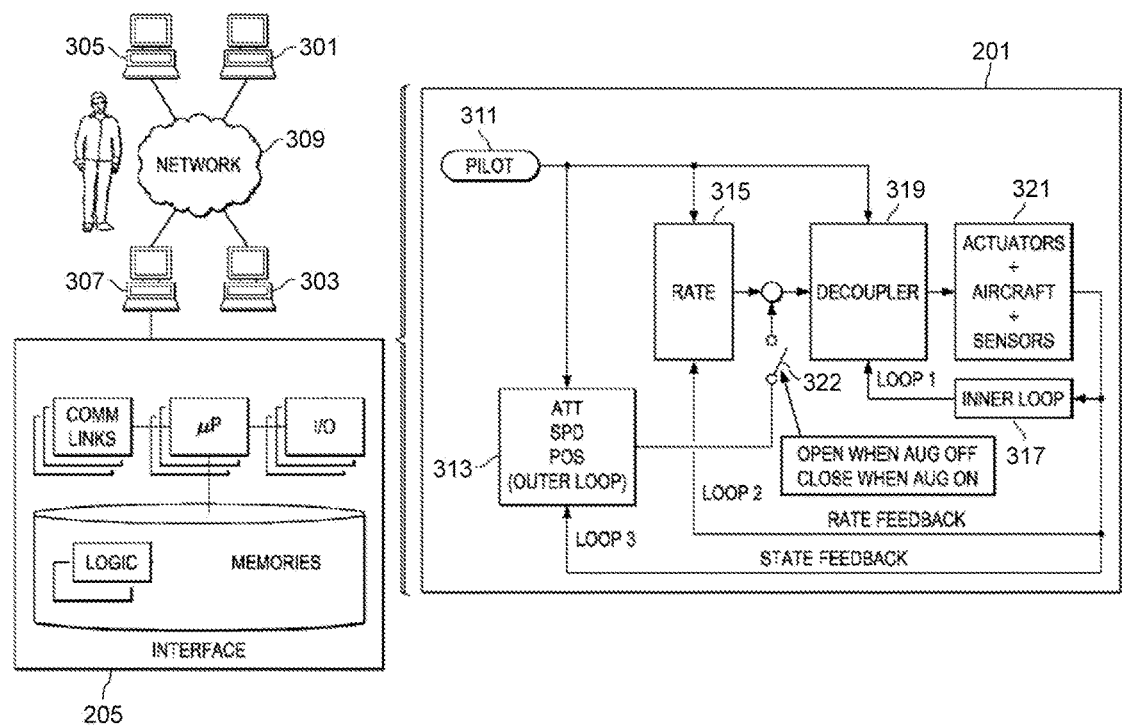
FIG. 3 representatively illustrates a three-loop flight control system 201 according to some embodiments.

Moving now to the operational aspects of flight control system 201, FIG. 3 illustrates in a highly schematic fashion, a manner in which flight control system 201 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 212, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, as the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

In some embodiments, the vertical speed hold function may be implemented or controlled in the outer loop 313. The vertical speed hold may be software running on the FCCs 205, and may cause the inner loop 317 to hold the vertical speed by activating a state machine that monitors and adjusts the vertical speed. The outer loop 313 may receive a command at a pilot input 311 such as the collective stick, and determine the selected vertical speed. In an embodiment, outer loop 313 may then determine the collective stick position necessary to achieve or hold the selected vertical speed, and cause, signal or message the inner loop 317 to hold the collective stick position. In other embodiments, the outer loop 313 may determine the selected vertical speed, and when the vertical speed hold should be implemented, and then cause the inner loop 317 and rate loop 315 to hold the selected vertical speed or selected collective stick position. The inner loop 317 and rate loop 315 may receive sensor data from aircraft equipment 321 such as sensors or other instrumentation, and adjust the collective stick position, collective setting and/or power setting to achieve the vertical speed received from the outer loop 313. Thus, the inner loop 317 and rate loop 315 may correct for updrafts, downdrafts or other winds, cyclic inputs, or the like, by continuously monitoring the vertical speed and adjusting the flight parameters to maintain the selected vertical speed.

Figure 4:
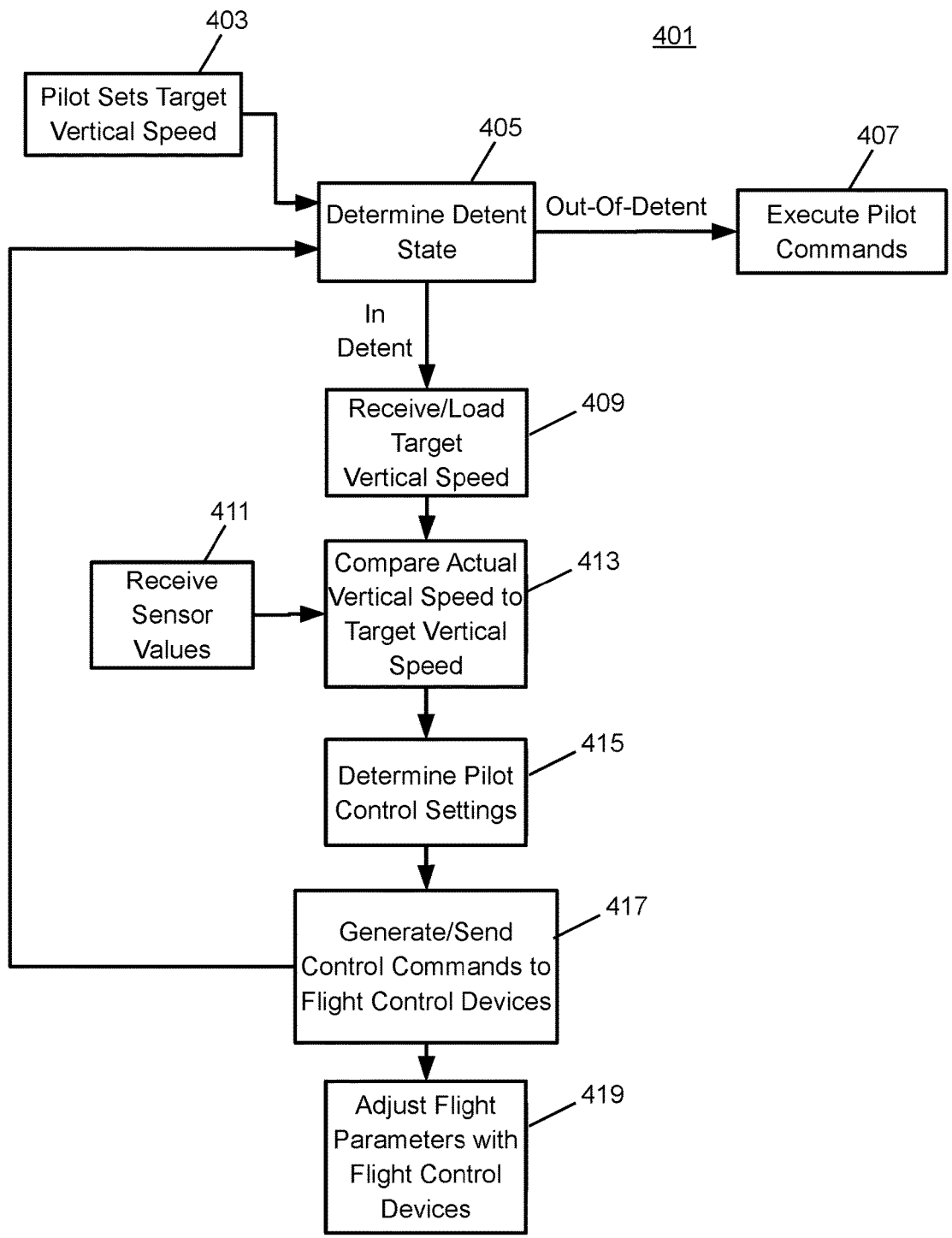
FIG. 4 is a flow diagram illustrating a method of performing a vertical speed hold according to some embodiments.

FIG. 4 is a flow diagram illustrating a method 401 of performing a vertical speed hold according to some embodiments. Initially, a pilot may set a target vertical speed in block 403. The FCCs may receive a vertical speed selection indication or signal and determine the current vertical speed of the rotorcraft, and use the current vertical speed as the selected vertical speed.

The detent state is determined in block 405. In some embodiments, the FCCs may monitor signals from the collective detent sensor and use signals indicating pilot induced movement or pilot control of the collective stick to determine whether the collective stick is ID or OOD. In some embodiments, when the FCCs determine that the pilot is handling or controlling the collective stick, the FCCs determine that the collective stick is OOD and execute pilot commands sent through the collective stick in block 407. In some embodiments, the FCCs may cause the trim motors to stop driving the collective stick to the vertical speed hold position when the FCCs determine that the collective stick is OOD.

When the FCCs determine that the collective stick is ID, indicating that the pilot has relinquished control of the collective stick, the FCCs may apply the vertical speed hold. The vertical speed hold is applied by receiving or loading a target vertical speed in block 409. In some embodiments, the FCCs receive a vertical speed by using an actual vertical speed of the rotorcraft when the pilot engages a vertical speed hold switch or control. In some embodiments, the FCCs determine whether the pilot has set or selected a vertical speed, and uses the selected vertical speed as the target vertical speed. In response to determining that the pilot has not selected a vertical speed, or has cleared the selected vertical speed, the FCCs may use a predetermined vertical speed or default vertical speed. Thus, the FCCs may determine a target vertical speed by loading a selected vertical speed from a memory or loading a default vertical speed from memory if a vertical speed has not yet been selected by a pilot.

The FCCs receive sensor values in block 411. In some embodiments, the sensor values indicate, or are used to determine, the vertical speed of the rotorcraft. For example, a vertical speed signal may be received by the FCCs from a differential pressure sensor that uses the change in outside air pressure to determine the vertical speed. In other examples, the FCCs may determine the vertical speed from changes in altitude indicated by a differential pressure-type altimeter, from a rangefinder-type altimeter, from inertial navigation, GPS, or another sensor or instrument. Additionally, the FCCs may receive other sensor values such as airspeed, altitude, engine RPM of other flight or operating parameters.

In block 413, the FCCs compare the actual vertical speed to the target vertical speed, and, in block 415, the FCCs determine the pilot control settings. In some embodiments, the FCCs determine collective and cyclic control settings required to achieve the target vertical speed. The FCCs may use the received sensor data, saved or calculated flight or rotorcraft parameters, or other data to determine the pilot control settings. For example, the FCCs may determine a collective setting needed to achieve the target vertical speed at a particular altitude, attitude and airspeed of the rotorcraft. In some embodiments, the FCCs may determine pilot control settings that will smoothly transition the rotorcraft to the target vertical speed by for example, smoothly increasing the vertical speed until the rotorcraft reaches the target vertical speed. In other embodiments, the FCCs may use data from other flight commands or parameters such as requested engine power, desired cyclic or required collective setting associated with another flight command, and determine the pilot control settings by taking into account the other flight commands or parameters. For example, as the nose of the rotorcraft pitches down to increase forward speed, the rotorcraft tends to drop somewhat, and to maintain or achieve the target vertical speed, the FCCs may require a collective and power setting greater than that needed for level flight. In another example, as the speed of the rotorcraft changes, the collective or power setting required to maintain level flight or a stable target vertical speed changes, and the FCCs may determine the current forward speed, or an anticipated forward speed from the cyclic commands, and set the collective based on the forward speed. In some embodiments, the FCCs determine a desired collective setting, and from the collective setting, determine a desired engine power setting. In yet another example, as the engine power is increased, the increased torque supplied to the main rotor may require heading correction. The FCCs may determine, based on the forward speed of the rotorcraft, that increased compensation by the anti-torque system, compensating cyclic input, or a combination of both, is needed to correct the heading or yaw created by the increased engine power, and generate adjusted or compensating anti-torque system and/or cyclic settings.

In block 417, the FCCs generate and send control commands to the relevant flight control devices. In some embodiments, the control commands are generated to achieve the settings determined in block 415. For example, the FCCs may determine a required collective setting required to achieve a target vertical speed and generate a collective set command or signal to set the collective stick to a position that will achieve the target vertical speed. The FCCs may then send the collective set command to the collective trim assembly or to the collective trim motor directly, which move the collective stick to set the vertical speed. The collective sensor detects the position of the collective stick and sends a signal to the FCCs indicating the collective stick position. The FCCs then send a corresponding flight control device control signal to actuators which control the main rotor blades through the swashplate. Additionally, the FCCs may generate one or more additional flight control device control signals for related flight control devices. For example, the FCCs may send a power control signal to the ECCUs, and the ECCUs may use the engine power control signals to set the engine power. In some embodiments, the ECCUs may set the engine power based on the engine power control signals, but may not set the engine power directly from the engine power control signals. For example, the ECCUs may use the engine power control signals as guidelines, modifying the engine power output to meet an anticipate power need associated with the collective setting, but may also adjust the power based on engine operating conditions, rotor head speed, torque conditions, or the like, which may be affected by weather, air pressure, air temperature, fuel quality, engine wear, environmental conditions, or the like. In block 419, the flight parameters are adjusted by the flight control devices. The fight control devices move or change based on the control signals sent from the FCC to adjust the flight parameters, and resulting flight, of the rotorcraft.

While the method 401 disclosed herein has been described in terms of discrete blocks, it should be understood that the method is not limited to the disclosed order of blocks. The FCCs continuously monitor the detent state, and continuously monitor the vertical speed of the rotorcraft to adjust or set the flight of the rotorcraft to have the target vertical speed while the collective stick remains in detent. In some embodiments, for example, the detent monitoring is a continuous feedback process, and the rotorcraft may go into or out of detent at any time, initiating or terminating the vertical speed hold based on the detent state. The FCCs continuously monitor the pilot's control of the collective stick, and where the FCCs determine that the pilot has released the stick, can cause the rotorcraft to fly with a vertical speed that is a default vertical speed, or a selected or target vertical speed identified by the pilot. Additionally, the pilot may override the vertical speed hold by taking control of the collective stick, causing the collective stick to enter an OOD state.

Figure 5:
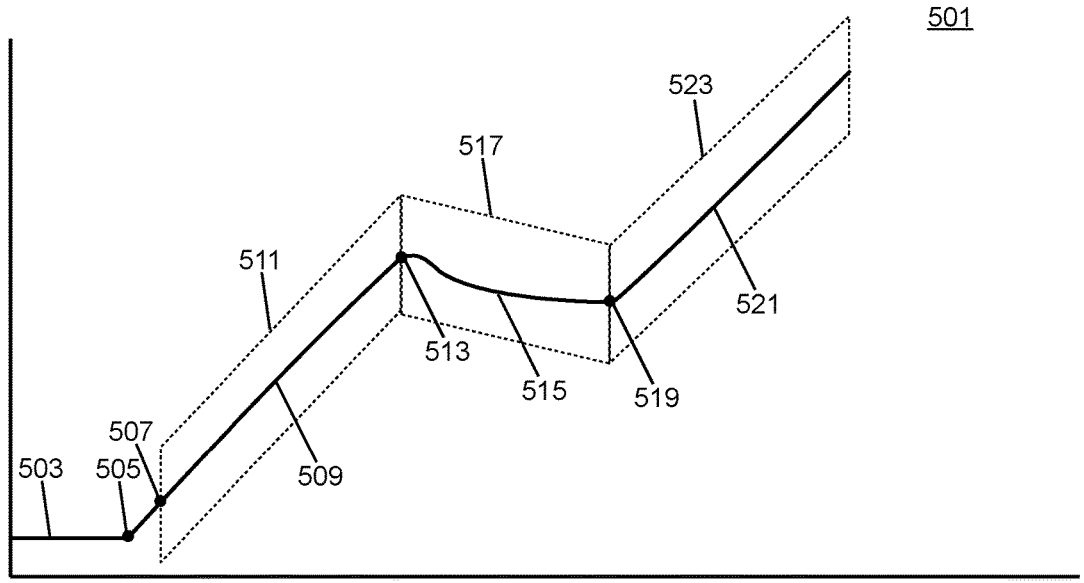
FIG. 5 is a chart illustrating a flight profile using a vertical speed hold according to some embodiments.

FIG. 5 is a chart 501 illustrating a flight profile using a vertical speed hold according to some embodiments. The vertical axis of the chart represents altitude of a rotorcraft in flight and the horizontal axis represents time. Thus, the angle of the flight profile represents the vertical speed as a change in altitude over a change in time.

Initially, the flight profile may have a level flight portion 503. The pilot may start ascending at a first point 505. Once the desired vertical speed is achieved, the pilot may select the vertical speed of the rotorcraft as the target vertical speed and release the collective stick at a second point 507. The FCCs detect that the collective stick is ID since the pilot has released the collective stick, and the FCCs hold the target vertical speed in a first ID period 511 so that the rotorcraft flies an ID first flight portion 509 under the held vertical speed. The pilot may retake control of the collective by grasping the collective stick at third point 513, causing the rotorcraft to enter an OOD period 517. The pilot may manually control the collective in a manual control portion 515 of the flight profile to, for example, avoid weather or a flock of birds, adjust a flight path, or the like. At a fourth point 519, the pilot may release the collective stick again, causing the FCCs to detect that collective stick has gone ID a second time. The rotorcraft enters a second ID period 523, and the FCCs cause the rotorcraft to return to the most recently selected vertical speed in a second flight portion 521 under vertical speed hold.

Figure 6:
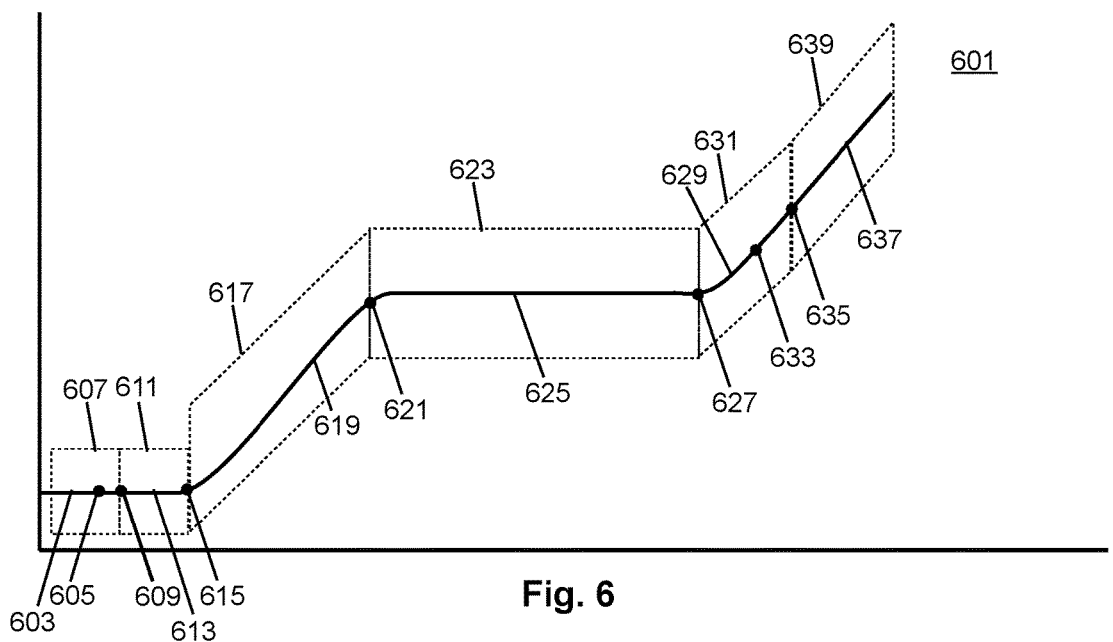
FIG. 6 is a chart illustrating a flight profile using a vertical speed hold and multiple target vertical speeds according to some embodiments.

FIG. 6 is a chart 601 illustrating a flight profile using a vertical speed hold and multiple target vertical speeds according to some embodiments. The vertical axis of the chart represents altitude of a rotorcraft in flight and the horizontal axis represents time. The flight profile may start with a near level or level flight portion 603 with the aircraft OOD in a first OOD period 607. The flight profile may start with the near level or level flight portion 603 since the aircraft maybe at a non-zero vertical speed when the aircraft is OOD. At a first point 605, the pilot may set the selected vertical speed, which in level flight would be a zero FPM vertical speed. At a second point 609, the pilot may release the collective stick, and the collective stick becomes ID for a first ID period 611. During the first ID period 611, the FCCs cause the rotorcraft to maintain level flight in a first ID level flight portion 613. At a third point 615, the pilot may retake control of the collective stick to cause the collective stick to go OOD, and manually enter a climb during a second OOD period 617. The rotorcraft ascends according to manual pilot control in first OOD flight portion 619. At a fourth point 621, the pilot releases the collective stick, causing the rotorcraft to enter a second ID period 623, with the FCCs returning the rotorcraft to level flight corresponding to the previously selected zero fpm vertical speed for a second ID level flight portion 625. At a fifth point 627, the pilot retakes control of the collective stick so that the rotorcraft enters a third OOD period 631 and the aircraft flies a second OOD flight portion 629 at a vertical speed manually controlled the pilot. At a sixth point 633, the pilot selects a new vertical speed for the vertical speed hold, which clears the previously selected vertical speed and uses the rotorcraft's vertical speed at the time of selection as the new target vertical speed. At a seventh point 635, the pilot releases the collective stick and the rotorcraft enters an ID state for a third ID period 639 where the rotorcraft flies a third ID portion of the flight profile 637 at the new target vertical speed selected by the pilot at point 633.

An embodiment rotorcraft includes a flight control computer (FCC) operable to provide a vertical speed hold for the rotorcraft, a collective control, and a collective trim motor connected to the collective control and in signal communication with the FCC. The collective trim motor is operable to move the collective control according to a collective set command generated by the FCC for providing the vertical speed hold according to a target vertical speed and in response to the FCC determining that the collective control is in-detent. The rotorcraft further includes a collective position sensor connected to the collective control and in signal communication with the FCC, where the collective position sensor is operable to generate, and send to the FCC, a collective position signal indicating the position of the collective control. One or more flight control devices are connected to the FCC and are operable to control a flight parameter of the rotorcraft in response to a flight control device control signal received from the FCC. The FCC is operable to generate the flight control device control signal according to the collective position signal, and to send the flight control device control signal to the one or more flight control devices.

In some embodiments, the rotorcraft may further include a collective detent sensor connected to the collective control and operable to send, to the FCC, a collective detent detection signal indicating whether a pilot controls the collective control. The FCC may be further operable to determine that the collective control is in-detent in response to the collective detent detection signal indicating that the pilot has released control of the collective control. In some embodiments, the FCC is further operable to determine that the collective control is out-of-detent in response to the collective detent detection signal indicating that the pilot has control of the collective control. In some embodiments, the rotorcraft further includes a vertical hold control connected to the FCC. The FCC is further operable to determine, in response to the vertical hold control being activated, a vertical speed of the rotorcraft, save the vertical speed of the rotorcraft as a selected vertical speed in a memory of the FCC, and set the target vertical speed to the selected vertical speed. In some embodiments, the FCC is further operable to set the target vertical speed to a default vertical speed in response to the selected vertical speed not being saved in the memory of the FCC. In some embodiments, the FCC is further operable to provide the vertical speed hold by generating the collective set command further in response to one or more rotorcraft operating parameters being within a predefined operating range. The FCC is further operable to provide a second function different from the vertical speed hold in response to activation of the vertical hold control and further in response to the one or more rotorcraft operating parameters the rotorcraft operating being outside the predefined operating range. In some embodiments, the one or more flight control devices include a main rotor collective control and an engine control computer, where the flight control device control signal includes an engine control signal and a collective control signal. The FCC may be operable to generate the flight control device control signal by determining a first flight control setting for the main rotor collective control according to the according to the collective position signal, sending the first flight control setting to the main rotor collective control, and sending a second flight control setting to the engine control computer.

An embodiment flight control system computer (FCC) for a rotorcraft includes a processor and a non-transitory computer-readable storage medium storing a program to be executed by the processor, with the program including instructions for providing a vertical speed hold. The instructions for providing the vertical speed hold including instructions for determining a target vertical speed for the rotorcraft in response to a pilot control of the rotorcraft being in an in-detent state, controlling positioning of one or more pilot controls according to the target vertical speed and in response one of the one or more pilot controls of the rotorcraft being in the in-detent state, and controlling one or more flight control devices of the rotorcraft according to positioning of the one or more pilot controls.

In some embodiments, the FCC further includes a computer readable memory, and the instructions for determining the target vertical speed include instructions for loading the target vertical speed from the computer readable memory. In some embodiments, the instructions for providing the vertical speed hold further include instructions for saving the target vertical speed in the computer readable memory of the FCC in response to a vertical speed selection indication. In some embodiments, the instructions for saving the target vertical speed include instructions for determining a current vertical speed of the rotorcraft in response to receiving the vertical speed selection indication, and saving the current vertical speed as the target vertical speed. In some embodiments, the instructions for saving the target vertical speed in the memory include instructions for saving the target vertical speed in the memory in response to a vertical speed selection indication and further in response to received sensor data indicating one or more rotorcraft operating parameters being within a predefined operating range. The program further includes instructions for providing a second function different from the vertical speed hold in response to a vertical speed selection indication and further in response to the received sensor data indicating the one or more rotorcraft operating parameters being outside the predefined operating range. In some embodiments, the instructions for providing the vertical speed hold further include instructions for releasing, in response to the pilot control being in an out-of-detent state, the vertical speed hold.

An embodiment method includes monitoring, by a flight control computer (FCC) of a rotorcraft, a detent state of a pilot control, where an in-detent state indicates that a pilot has released control of the pilot control, determining a target vertical speed by the FCC in response to detecting an in-detent state, determining at least one flight control setting according to the target vertical speed, and performing, by the FCC, a vertical speed hold by controlling a flight control device of the rotorcraft according to the flight control setting.

In some embodiments, the controlling the flight control device includes controlling a collective setting of a rotor of the rotorcraft, and where the pilot control is a collective stick. In some embodiments, the determining a target vertical speed comprises loading the target vertical speed from a memory of the FCC. In some embodiments, the method further includes saving the target vertical speed in the memory of the FCC in response to a vertical speed selection indication from a pilot. In some embodiments, the method further includes limiting the saving the target vertical speed to a vertical speed falling within a predefined operating range of one or more rotorcraft operating parameters. In some embodiments, the saving the target vertical speed includes determining a current vertical speed of the rotorcraft in response to receiving the vertical speed selection indication from the pilot, and saving the current vertical speed as the target vertical speed. In some embodiments, the method further includes, releasing, in response to detecting an out-of-detent state of the pilot control and while the FCC is controlling the flight control device according to the flight control setting, the vertical speed hold and controlling, by the FCC, the vertical speed of the rotorcraft in response to pilot commands on the pilot control.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft, comprising:
   a flight control computer (FCC) operable to provide a vertical speed hold for the rotorcraft;
   a collective control;
   a collective trim motor connected to the collective control and in signal communication with the FCC, wherein the collective trim motor is operable to move the collective control according to a collective set command generated by the FCC for providing the vertical speed hold according to a target vertical speed and in response to the FCC determining that the collective control is in-detent, wherein the collective control being in-detent indicates that a pilot has released manual control of the collective control, and wherein the collective control being out-of-detent indicates that the pilot is manually controlling the collective control;
   a collective position sensor connected to the collective control and in signal communication with the FCC, wherein collective position sensor is operable to generate, and send to the FCC, a collective position signal indicating a position of the collective control; and
   one or more flight control devices connected to the FCC and operable to control a flight parameter of the rotorcraft in response to a flight control device control signal received from the FCC;
   wherein the FCC is operable to generate the flight control device control signal according to the collective position signal in response to the collective control being out-of-detent with the pilot manually controlling the collective control, wherein the FCC is operable to generate the flight control device control signal according to the collective set command in response to the collective control being in-detent with the pilot having released manual control of the collective control, and wherein the FCC is further operable to send the flight control device control signal to the one or more flight control devices.

2. The rotorcraft of claim 1, further comprising a collective detent sensor connected to the collective control and operable to send, to the FCC, a collective detent detection signal indicating whether a pilot controls the collective control, wherein the FCC is further operable to determine that the collective control is in-detent in response to the collective detent detection signal indicating that the pilot has released control of the collective control.

3. The rotorcraft of claim 2, wherein the FCC is further operable to determine that the collective control is out-of-detent in response to the collective detent detection signal indicating that the pilot has control of the collective control.

4. The rotorcraft of claim 1, further comprising a vertical hold control connected to the FCC, wherein the FCC is further operable to:
   determine, in response to the vertical hold control being activated, a vertical speed of the rotorcraft;
   save the vertical speed of the rotorcraft as a selected vertical speed in a memory of the FCC; and
   set the target vertical speed to the selected vertical speed.

5. The rotorcraft of claim 4, wherein the FCC is further operable to:
   set the target vertical speed to a default vertical speed in response to the selected vertical speed not being saved in the memory of the FCC.

6. The rotorcraft of claim 4, wherein the FCC is further operable to provide the vertical speed hold by generating the collective set command further in response to one or more rotorcraft operating parameters being within a predefined operating range; and
   wherein the FCC is further operable to provide a second function different from the vertical speed hold in response to activation of the vertical hold control and further in response to the one or more rotorcraft operating parameters the rotorcraft operating being outside the predefined operating range.

7. The rotorcraft of claim 1, wherein the one or more flight control devices comprise a main rotor collective control and an engine control computer;
   wherein the flight control device control signal includes an engine control signal and a collective control signal; and
   wherein the FCC is operable to generate the flight control device control signal by:
   determining a first flight control setting for the main rotor collective control according to the according to the collective position signal; and
   sending the first flight control setting to the main rotor collective control and sending a second flight control setting to the engine control computer.

8. A flight control system computer (FCC) for a rotorcraft, comprising:
   a processor; and
   a non-transitory computer-readable storage medium storing a program to be executed by the processor, the program including instructions for providing a vertical speed hold, the instructions for providing the vertical speed hold including instructions for:
   determining a target vertical speed for the rotorcraft in response to a pilot control of the rotorcraft being in an in-detent state, wherein the pilot control being in the in-detent state indicates that a pilot has released manual control of the pilot control, and wherein the pilot control being in an out-of-detent state indicates that the pilot is manually controlling the pilot control;
   controlling positioning of one or more pilot controls according to the target vertical speed and in response one of the one or more pilot controls of the rotorcraft being in the in-detent state; and
   controlling one or more flight control devices of the rotorcraft according to positioning of the one or more pilot controls and in response to the one or more pilot controls of the rotorcraft being in the out-of-detent state.

9. The FCC of claim 8, further comprising a computer readable memory;
   wherein the instructions for determining the target vertical speed include instructions for loading the target vertical speed from the computer readable memory.

10. The FCC of claim 9, wherein the instructions for providing the vertical speed hold further include instructions for saving the target vertical speed in the computer readable memory of the FCC in response to a vertical speed selection indication.

11. The FCC of claim 10, wherein the instructions for saving the target vertical speed include instructions for:
    determining a current vertical speed of the rotorcraft in response to receiving the vertical speed selection indication; and
    saving the current vertical speed as the target vertical speed.

12. The FCC of claim 10, wherein the instructions for saving the target vertical speed in the memory include instructions for saving the target vertical speed in the memory in response to a vertical speed selection indication and further in response to received sensor data indicating one or more rotorcraft operating parameters being within a predefined operating range; and
    wherein the program further includes instructions for providing a second function different from the vertical speed hold in response to a vertical speed selection indication and further in response to the received sensor data indicating the one or more rotorcraft operating parameters being outside the predefined operating range.

13. The FCC of claim 8, wherein the instructions for providing the vertical speed hold further include instructions for releasing, in response to the pilot control being in an out-of-detent state, the vertical speed hold.

14. A method, comprising:
    monitoring, by a flight control computer (FCC) of a rotorcraft, a detent state of a pilot control, wherein an in-detent state indicates that a pilot has released manual control of the pilot control;
    determining a target vertical speed by the FCC in response to detecting an in-detent state;
    determining at least one flight control setting according to the target vertical speed;
    performing, by the FCC, a vertical speed hold by controlling a flight control device of the rotorcraft according to the target vertical speed and in response to the FCC detecting that the pilot control is in an in-detent state with the pilot having released manual control of the pilot control; and
    controlling, by the FCC, the vertical speed of the rotorcraft according to pilot commands on the pilot control and in response to the pilot control being out-of-detent with the pilot manually controlling the pilot control.

15. The method of claim 14, wherein the controlling the flight control device includes controlling a collective setting of a rotor of the rotorcraft, and wherein the pilot control is a collective stick.

16. The method of claim 14, wherein the determining a target vertical speed comprises loading the target vertical speed from a memory of the FCC.

17. The method of claim 16, further comprising saving the target vertical speed in the memory of the FCC in response to a vertical speed selection indication from a pilot.

18. The method of claim 17, further comprising limiting the saving the target vertical speed to a vertical speed falling within a predefined operating range of one or more rotorcraft operating parameters.

19. The method of claim 17, wherein the saving the target vertical speed comprises:
    determining a current vertical speed of the rotorcraft in response to receiving the vertical speed selection indication from the pilot; and
    saving the current vertical speed as the target vertical speed.

20. The method of claim 14, further comprising, releasing, in response to detecting an out-of-detent state of the pilot control and while the FCC is controlling the flight control device according to the flight control setting, the vertical speed hold and controlling, by the FCC, the vertical speed of the rotorcraft in response to pilot commands on the pilot control.

* * * * *